United States Patent
Buri et al.

(10) Patent No.: US 8,992,804 B2
(45) Date of Patent: Mar. 31, 2015

(54) USE OF 2-((1-METHYLPROPYL) AMINO)ETHANOL AS ADDITIVE IN AQUEOUS SUSPENSIONS OF CALCIUM CARBONATE-COMPRISING MATERIALS

(75) Inventors: Matthias Buri, Rothrist (CH); Samuel Rentsch, Aarburg (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 380 days.

(21) Appl. No.: 13/522,540

(22) PCT Filed: Jan. 20, 2011

(86) PCT No.: PCT/EP2011/050737
§ 371 (c)(1),
(2), (4) Date: Aug. 20, 2012

(87) PCT Pub. No.: WO2011/089176
PCT Pub. Date: Jul. 28, 2011

(65) Prior Publication Data
US 2013/0134365 A1    May 30, 2013

Related U.S. Application Data

(60) Provisional application No. 61/337,192, filed on Feb. 1, 2010.

(30) Foreign Application Priority Data

Jan. 25, 2010 (EP) .................................... 10151603

(51) Int. Cl.
*H01B 1/12* (2006.01)
*C07C 215/00* (2006.01)
*C09C 1/02* (2006.01)

(52) U.S. Cl.
CPC .............. *H01B 1/12* (2013.01); *C01P 2004/61* (2013.01); *C01P 2004/62* (2013.01); *C01P 2006/22* (2013.01); *C09C 1/021* (2013.01)
USPC ....................................... 252/519.3; 564/503

(58) Field of Classification Search
None
See application file for complete search history.

(56) References Cited

U.S. PATENT DOCUMENTS

| | | | |
|---|---|---|---|
| 5,914,135 A * | 6/1999 | Dubek et al. | 424/687 |
| 6,224,946 B1 | 5/2001 | Kirchmeyer et al. | |
| 2003/0232906 A1 * | 12/2003 | Ghosh | 524/82 |

FOREIGN PATENT DOCUMENTS

| | | |
|---|---|---|
| WO | 9849261 A1 | 11/1998 |
| WO | 9856988 A1 | 12/1998 |

OTHER PUBLICATIONS

The International Search Report dated Mar. 24, 2011 for PCT Application No. PCT/EP2011/050737.
The Written Opinion of the International Searching Authority dated Mar. 24, 2011 for PCT Application No. PCT/EP2011/050737.
The Office Action, dated Oct. 15, 2014 for Korean Application No. 10-2012-7-22289.
The Office Action, dated Nov. 3, 2013 for Taiwanese Application No. 100102443.

* cited by examiner

*Primary Examiner* — Harold Pyon
*Assistant Examiner* — Jaison Thomas
(74) *Attorney, Agent, or Firm* — Amster, Rothstein & Ebenstein LLP

(57) ABSTRACT

Use of 2-((1-methylpropyl)amino)ethanol as an additive in an aqueous suspension, containing from 25 to 62 vol. % of at least one calcium carbonate-comprising material, wherein the use provides improved stability with regard to the conductivity of the suspension.

27 Claims, No Drawings

USE OF 2-((1-METHYLPROPYL) AMINO)ETHANOL AS ADDITIVE IN AQUEOUS SUSPENSIONS OF CALCIUM CARBONATE-COMPRISING MATERIALS

CROSS-REFERENCE TO RELATED APPLICATIONS

This application is a U.S. National phase of PCT Application No. PCT/EP2011/050737, filed Jan. 20, 2011, which claims priority to European Application No. 10151603.7, filed Jan. 25, 2010 and U.S. Provisional Application No. 61/337,192, filed Feb. 1, 2010.

The present invention relates to the technical domain of aqueous suspensions of calcium carbonate-comprising materials and additives added thereto.

In the preparation of aqueous suspensions of calcium carbonate-comprising materials, the skilled man is often required to select and introduce additives in order to regulate one or more characteristics of this suspension.

In making this additive selection, the skilled man must bear in mind that this additive should remain cost efficient and should not lead to unwanted interactions or effects downstream during the transportation, processing and application of this suspension.

Among the considerations of the skilled man that have rarely been addressed but which the Applicant has realized is of importance, is the selection of additives that do not cause a significant variation, and namely increase, in the electrical conductivity of the calcium carbonate-comprising material suspension.

Indeed, it may be advantageous to regulate aspects of the processing and transport of such a suspension based on measurements of the suspension's electrical conductivity.

For example, the flow rate of such a suspension through a given passage or unit may be controlled according to measurements made of the suspension conductivity. In the publication entitled "A Conductance Based Solids Concentration Sensor for Large Diameter Slurry Pipelines" by Klausner F et al. (J. Fluids Eng./Volume 122/Issue 4/Technical Papers), an instrument measuring the solids concentration of a slurry passing through pipelines of a given diameter based on conductance measurements is described. Based on these conductance measurements, it is possible to obtain a graphical display showing the variation of slurry concentration from the top to the bottom of the pipe, as well as the area-average concentration history.

The degree of filling of a container can likewise be managed by detecting conductivity at a given height along a container wall.

However, in order to use and take advantage of such regulation systems based on measurements of electrical conductivity, the skilled man is faced with the challenge of selecting additives needed to serve one or more functions that do not in parallel cause significant variations in the electrical conductivity values.

Among the functions of the additives used in calcium carbonate-comprising material suspensions, is the adjustment of the suspension pH, whether it is by acidification, neutralization, or alkalinisation of this suspension.

Suspension alkalinisation is notably required in order to match the pH of application environments into which the suspension is introduced, or in preparation for the addition of pH-sensitive additives. A step of raising the pH may also serve to disinfect or support the disinfection of a suspension. Adjustments to pH may be necessary to avoid the unwanted dissolution of calcium carbonate on contact with an acidic environment during processing.

Such pH adjusting additives used in aqueous suspension of calcium carbonate-comprising material suspensions and available to the skilled man are numerous.

A first group of additives that may be used to raise the pH of an aqueous suspension of calcium carbonate-comprising materials are hydroxide-containing additives, and are especially alkali and earth alkali metal hydroxides.

For example, U.S. Pat. No. 6,991,705 refers to increasing the alkalinity of a pulp suspension, which may comprise calcium carbonate, by a combination of an alkali metal hydroxide feed, such as a sodium hydroxide feed, and a carbon dioxide feed.

Potassium hydroxide, magnesium hydroxide and ammonium hydroxide are other such additives used to control the pH of a PCC suspension in a range from 10 to 13, as referred to in EP 1 795 502.

A liquid abrasive cleaning composition of pH 7-13 which comprises one or more surfactants forming a suspending system, one or more suspended abrasives, a C2-C6 alkanolamine, and a hydrocarbon co-solvent is described in WO 98/49261.

WO 98/56988 relates to a process for stabilizing the pH of a pulp suspension with buffering agents and to a process for producing paper from a stabilized pulp suspension. The alkalinity of the pulp suspension is increased by a combination of an alkali metal hydroxide feed and a carbon dioxide feed.

A second group of additives that may be used to raise the pH of an aqueous suspension of calcium carbonate-comprising materials are additives that do not contain hydroxide ions, but which generate such ions on reaction with water.

Such additives may be salts, such as sodium salts, of weak acids. Examples of this type of additive would include sodium acetate, sodium bicarbonate, potassium carbonate and alkaline phosphates (such as tripolyphosphates, sodium and/or potassium orthophosphates).

A further possibility is to employ nitrogen-based additives, including for example ammonia, amines and amides, in order to increase the pH of calcium carbonate-comprising material suspensions.

Notably, these may include primary, secondary or tertiary amines. Alkanolamines used to increase suspension pH include for example monoethanolamine (MEA), diethanolamine (DEA), and methylaminoethanol (MAE).

All of the above additives raise the pH of the aqueous suspension according to a common mechanism, which is by providing or creating, following reaction with water, hydroxide ions in the suspension.

From the literature, it is known that increasing the hydroxide ion concentration under alkaline condition leads in parallel to an increased conductivity ("Analytikum", 5th Edition, 1981, VEB Deutscher Verlag für Grundstoffindustrie, Leipzig, page 185-186 referring to "Konduktometrische Titration").

Given the above general knowledge documented in the literature, along with the supporting evidence that alkali and earth alkali hydroxides, as well as amines such as triethanolamine cause a significant conductivity increase in parallel to raising the pH of an aqueous suspension of calcium carbonate-comprising materials, as shown in the Examples section hereafter, the skilled man could have no expectation that a particular pH regulating agent, that raises the suspension pH according to the same mechanism as these additives, i.e. the resulting introduction of hydroxide ions in the suspension, would cause only a minimal conductivity increase.

It was therefore entirely by surprise, and in contrast to the expectation based on common additives used to increase pH, that the Applicant identified that 2-((1-methylpropyl)amino) ethanol can be used as an additive in an aqueous suspension and having a pH of between 8.5 and 11 and containing from 25 to 62 vol. % of at least one calcium carbonate-comprising material, to increase the suspension pH by at least 0.3 pH units, while maintaining the suspension conductivity to within 100 µS/cm/pH unit.

Therefore, a first aspect of the present invention refers to the use of 2-((1-methylpropyl)amino)ethanol

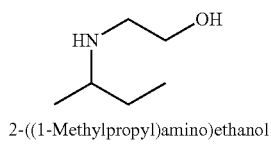

2-((1-Methylpropyl)amino)ethanol as additive in an aqueous suspension containing from 25 to 62 vol. %, based on the total volume of the suspension, of at least one calcium carbonate-comprising material and having a pH of between 8.5 and 11, for increasing the suspension pH by at least 0.3 pH units, wherein the suspension conductivity change is not more than 100 µS/cm per pH unit.

"Conductivity" according to the present invention shall mean the electrical conductivity of an aqueous carbonate-comprising material suspension as measured according to the measurement method defined in the examples section herebelow.

For the purpose of the present invention, pH shall be measured according to the measurement method defined in the examples section herebelow.

The volume % (vol. %) of a solid material in suspension is determined according to the method defined in the examples section hereafter.

In a preferred embodiment, the said 2-((1-methylpropyl) amino)ethanol additive is added as a water based solution to the calcium carbonate-comprising material.

In another preferred embodiment, the said 2-((1-methylpropyl)amino)ethanol additive has a chemical purity of more than 90%, preferably more than 95% and more preferred more than 99% in respect to 2-((1-methylpropyl)amino)ethanol.

In a preferred embodiment, said suspension has a conductivity of between 700 and 2000 µS/cm, and preferably of between 800 and 1300 µS/cm, prior to 2-((1-methylpropyl) amino)ethanol addition.

In another preferred embodiment, following the addition of said 2-((1-methylpropyl)amino)ethanol, the suspension conductivity change is not more than 70 µS/cm per pH unit, and preferably not more than 50 µS/cm per pH unit.

In another preferred embodiment, following the addition of said 2-((1-methylpropyl)amino)ethanol, the suspension conductivity does not change by more than 10%, preferably does not change by more than 6%, and more preferably does not change by more than 3%.

In another preferred embodiment, prior to addition of said 2-((1-methylpropyl)amino)ethanol, the suspension has a pH between 9 and 10.3.

In another preferred embodiment, 2-((1-methylpropyl) amino)ethanol is added to said suspension in an amount to increase the pH of the aqueous suspension by at least 0.4 pH units.

When the suspension pH prior to the 2-((1-methylpropyl) amino)ethanol addition is between 8.5 and 9, said 2-((1-methylpropyl)amino)ethanol is preferably added to said suspension in an amount to increase the pH of the suspension by at least 1.0 pH units. In the case where the suspension pH prior to 2-((1-methylpropyl)amino)ethanol addition is between 9 and 10, said 2-((1-methylpropyl)amino)ethanol is preferably added to said suspension in an amount to increase the pH of the aqueous suspension by at least 0.7 pH units.

Prior to 2-((1-methylpropyl)amino)ethanol addition, said suspension preferably has a temperature of between 5 and 100° C., more preferably of between 35 and 85° C., and even more preferably of between 45 and 75° C.

In a preferred embodiment, said 2-((1-methylpropyl) amino)ethanol is added to said suspension in an amount of from 500 to 15000 mg, preferably of from 1000 to 5000 mg, and more preferably of 1 300 to 2000 mg, per liter of the aqueous phase of said suspension.

As regards said calcium carbonate-comprising material in suspension, this material preferably comprises at least 50%, preferably of at least 80%, and more preferably of at least 98%, by weight of calcium carbonate relative to the total equivalent dry weight of said calcium carbonate-comprising material.

The calcium carbonate of said carbonate-comprising material may be a precipitated calcium carbonate (PCC), a natural ground calcium carbonate (NGCC), a surface-reacted calcium carbonate (SRCC), or a mixture thereof.

Surface-reacted calcium carbonates are understood to refer to products resulting from the reaction of a calcium carbonate with an acid and carbon dioxide, said carbon dioxide being formed in situ by the acid treatment and/or supplied externally, and the surface-reacted natural calcium carbonate being prepared as an aqueous suspension having a pH of greater than 6.0, measured at 20° C. Such products are described in, among other documents, WO 00/39222, WO 2004/083316 and EP 2 070 991, the content of these references herewith being included in the present application.

In a preferred embodiment, said suspension comprises from 45 to 60 vol. % and preferably from 48 to 58 vol. % and most preferred from 49 to 57 vol. %, of said calcium carbonate-comprising material based on the total volume of said suspension.

In another preferred embodiment, said 2-((1-methylpropyl)amino)ethanol is added prior to, during or after, and preferably after, a step of grinding said calcium carbonate-comprising material in said suspension It may also be advantageous that said 2-((1-methylpropyl) amino)ethanol be added to the dry form of said calcium carbonate-comprising material and preferably dry ground therewith before forming said suspension of calcium carbonate-comprising material.

Following addition of said 2-((1-methylpropyl)amino) ethanol to said suspension, the suspension may be introduced in a unit equipped with a conductivity-based regulation device.

For example, the suspension may be introduced in a container or unit up to a level determined by measurement of the suspension conductivity.

The suspension may additionally or alternatively be passed through a passage having a suspension throughput regulated as a function of the suspension conductivity.

In this respect, "passage" can relate to a confined region of throughput, as well as a throughput without any definition of confinement, i.e. after one passage of the process.

It is to be understood that the above-mentioned embodiments of the invention can be used and are contemplated to be used in combination with each other.

In view of the advantages of the use of 2-((1-methylpropyl) amino)ethanol described above, a further aspect of the present invention refers to a method for increasing the pH of an aqueous suspension containing from 25 to 62 vol. % of at least one calcium carbonate-comprising material and having a pH in the range of between 8.5 and 11 is provided, wherein the method involves the step of adding 2-((1-methylpropyl)

amino)ethanol to the suspension in an amount, so that the pH of the suspension is increased by at least 0.3 pH units, preferably by at least 0.5 or at least 0.7 pH units and, at the same time, the suspension conductivity change caused by the addition of 2-((1-methylpropyl)amino)ethanol is not more than 100 μS/cm per pH unit, preferably is not more than 50 μS/cm per pH unit and very preferably is not more than 20 μS/cm per pH unit.

It is to be understood that the advantageous embodiments described above with respect to the inventive use of 2-((1-methylpropyl)amino)ethanol also can be used for the inventive method. In other words, the preferred embodiments described above and any combinations of these embodiments can also be used for the inventive method.

The scope and interest of the invention will be better understood based on the following examples which are intended to illustrate certain embodiments of the invention and are non-limitative.

EXAMPLES

Measurement Methods:

Suspension pH Measurement

The pH of a suspension is measured at 25° C. using a Mettler Toledo Seven Easy pH meter and a Mettler Toledo InLab® Expert Pro pH electrode.

A three point calibration (according to the segment method) of the instrument is first made using commercially available buffer solutions having pH values of 4, 7 and 10 at 20° C. (from Aldrich).

The reported pH values are the endpoint values detected by the instrument (the endpoint is when the measured signal differs by less than 0.1 mV from the average over the last 6 seconds).

Suspension Conductivity Measurement

The conductivity of a suspension is measured at 25° C. using Mettler Toledo Seven Multi instrumentation equipped with the corresponding Mettler Toledo conductivity expansion unit and a Mettler Toledo InLab® 730 conductivity probe, directly following stirring this suspension at 1 500 rpm using a pendraulik tooth disc stirrer.

The instrument is first calibrated in the relevant conductivity range using commercially available conductivity calibration solutions from Mettler Toledo. The influence of temperature on conductivity is automatically corrected by the linear correction mode.

Measured conductivities are reported for the reference temperature of 20° C. The reported conductivity values are the endpoint values detected by the instrument (the endpoint is when the measured conductivity differs by less than 0.4% from the average over the last 6 seconds).

Particle Size Distribution (Mass % Particles with a Diameter <X) and Weight Median Grain Diameter ($d_{50}$) of Particulate Material Weight median grain diameter and grain diameter mass distribution of a particulate material are determined via the sedimentation method, i.e. an analysis of sedimentation behavior in a gravimetric field. The measurement is made with a Sedigraph™ 5100.

The method and the instrument are known to the skilled person and are commonly used to determine grain size of fillers and pigments. The measurement is carried out in an aqueous solution of 0.1% by weight of $Na_4P_2O_7$. The samples were dispersed using a high speed stirrer and ultrasonic.

Viscosity Measurement

The Brookfield viscosity is measured after 1 minute of stirring by the use of a RVT model Brookfield™ viscometer at room temperature and a rotation speed of 100 rpm (revolutions per minute) with the appropriate disc spindle 2, 3 or 4 at room temperature.

Volume Solids (Vol. %) of a Material in Suspension

The volume solids is determined by dividing the volume of the solid material by the total volume of the aqueous suspension.

The volume of the solid material is determined by weighing the solid material obtained by evaporating the aqueous phase of suspension and drying the obtained material to a constant weight at 120° C., and converting this weight value to a volume value by division with the specific gravity of the solid material.

The examples herebelow, employing a material consisting of essentially only calcium carbonate, used a specific gravity value of 2.7 g/ml, based on that listed for natural calcite in the Handbook of Chemistry and Physics (CRC Press; 60th edition), for the purpose of the above volume solids calculation.

Weight Solids (% by Weight) of a Material in Suspension

The weight solids is determined by dividing the weight of the solid material by the total weight of the aqueous suspension.

The weight of the solid material is determined by weighing the solid material obtained by evaporating the aqueous phase of suspension and drying the obtained material to a constant weight Additive Addition Amount in Mg Per Liter of Aqueous Phase of a Suspension In order to evaluate the amount of additive per liter of the aqueous phase of a suspension, the volume in liters (l) of the aqueous phase is first determined by subtracting the volume of the solid phase (see volume solids determination above) from the total volume of the suspension.

Example 1

This example implements a natural calcium carbonate of Norwegian Marble origin obtained by first autogenously dry grinding 10 to 300 mm calcium carbonate rocks to a fineness corresponding to a $d_{50}$ of between 42 to 48 μm, and subsequently wet grinding this dry-ground product in water in a 1.4-liter vertical bead mill (Dynomill) using 0.6-1 mm zirconium silicate beads at a weight solids content of between 5 and 15% by weight, until 95% by weight of the particles have a diameter <2 μm, 75% by weight of the particles have a diameter <1 μm, 8% by weight of the particles have a diameter <0.2 μm and a $d_{50}$ of 0.61 μm is reached. During the grinding processes, no dispersing or grinding aids are added.

The obtained suspension is then concentrated using a filter press to form a filter cake having a volume solids content of approximately 45% by volume. A subsequent thermal concentration following the addition of 0.45% by weight, based on the weight of solids, of a 50 molar % sodium-neutralized polyacrylic acid (Mw≅12 000 g/mol, Mn≅5 000 g/mol) and 0.20% by weight, based on the weight of solids, of sodium dihydrogen phosphate, leads to a suspension having a volume solids content of approximately 50% by volume.

0.4 kg of this suspension are introduced in a 1-liter beaker having a diameter of 8 cm. A pendraulik tooth disc stirrer is introduced in the beaker such the stirrer disc is located approximately 1 cm above the bottom of the beaker. The initial suspension conductivity and pH values measured are reported in the table below.

Under stirring at 5000 rpm, the additive type (in the form of an aqueous solution), indicated in each of the tests described in the table below (PA=additive according to the prior art, IN=additive according to the present invention), is added in the indicated amount to the slurry over a period of one minute. After completed addition, the slurry is stirred for an additional 5 minutes, after which time the suspension pH and the conductivity are measured.

TABLE 1

| Test | | Suspension volume solid content (vol. %) | Initial suspension conductivity (+/−10 μS/cm) -- pH (+/−0.1) | Additive Type (in solution)/ Solution concentration | Additive addition amount (mg/l of aqueous phase) | Conductivity (+/−10 μS/cm)/ pH (+/−0.1) after additive addition | μS/cm/ pH unit |
|---|---|---|---|---|---|---|---|
| 1 | PA | 49.4 | 1 293--9.5 | KOH/30% | 2 639 | 3 120/12.3 | 653 |
| 2 | IN | 49.4 | 1 293--9.5 | 2-((1-methyl-propyl)amino)ethanol/100% | 2 639 | 1 311/10.4 | 20 |

The results of the above table show that the objectives are attained solely by the process according to the invention.

Example 2

This example implements a natural calcium carbonate of Norwegian origin obtained by first autogenously dry grinding 10 to 300 mm calcium carbonate rocks to a fineness corresponding to a $d_{50}$ of between 42 to 48 μm, and subsequently wet grinding this dry-ground product in water to which 0.65% by weight, based on the equivalent dry weight of the solids material, of a sodium and magnesium-neutralized polyacrylate (Mw≅6 000 g/mol, Mn≅2 300 g/mol), in a 1.4-liter vertical bead mill (Dynomill) using 0.6-1 mm zirconium silicate beads at a weight solids content of 77.5% by weight, and recirculated through the mill until 90% by weight of the particles have a diameter <2 μm, 65% by weight of the particles have a diameter <1 μm, 15% by weight of the particles have a diameter <0.2 μm and a $d_{50}$ of 0.8 μm is reached.

0.4 kg of this suspension are introduced in a 1-liter beaker having a diameter of 8 cm. A pendraulik tooth disc stirrer, is introduced in the beaker such that the stirrer disc is located approximately 1 cm above the bottom of the beaker. The initial suspension conductivity and pH values measured are reported in the table below, as well as the Brookfield viscosity measured at room temperature and 100 rpm (revolutions per minute) which before addition of the additive is equal to 526 mPas.

Under stirring at 5000 rpm, the additive type (in the form of an aqueous solution) indicated in each of the tests described in the table below (PA=additive according to the prior art, IN=additive according to the present invention), is added in the indicated amount to the slurry over a period of one minute. After completed addition, the slurry is stirred for an additional 5 minutes, after which time the suspension pH and the conductivity are measured, as well as the Brookfield viscosity which is measured at room temperature and 100 rpm after 60 seconds (corresponding to 0 day in the table 2). The slurry samples are stirred continuously at 20 rpm and room temperature during several days. The Brookfield viscosity is measured again after a storage time of 2 days, 4 days and 7 days. The reported Brookfield viscosities in table 2 below are measured at 100 rpm after 60 seconds.

The results of the above table show that the objectives are attained solely by the process according to the invention.

The results show also that the use of the 2-((1-methylpropyl)amino)ethanol presents the advantage to achieve the stability of the Brookfield viscosity of the suspensions additionally to the objectives.

Example 3

In this example, the pH of a calcium carbonate suspension was adjusted to a defined pH value with a KOH solution and with 2-((1-methylpropyl)amino)ethanol, respectively.

This example implements a natural calcium carbonate of Austrian origin (Region of Kärnten) obtained by first autogenously wet grinding 10 to 300 mm calcium carbonate rocks to a fineness corresponding to a $d_{50}$ of between 42 to 48 μm, and subsequently further wet grinding this pre-ground product to which 0.65% by weight, based on the equivalent dry weight of the solids material, of a 50 molar % sodium and 50 molar % magnesium-neutralised polyacrylate homopolymer (Mw≅6 000 g/mol, Mn≅2 300 g/mol), in a 1.4-liter vertical bead mill (Dynomill) using 0.6-1 mm zirconium silicate beads at a weight solids content of 77.5% by weight, and recirculated through the mill until 90% by weight of the particles have a equivalent spherical diameter <2 μm, 65% by weight of the particles have a equivalent spherical diameter <1 μm, 15% by weight of the particles have a equivalent spherical diameter <0.2 μm and a $d_{50}$ of 0.7 μm is reached (measured by Sedigraph 5100).

0.4 kg of this suspension are introduced in a 1-liter beaker. A Pendraulik tooth disc stirrer, is introduced in the beaker such that the stirrer disc is located approximately 1 cm above the bottom of the beaker. The initial suspension conductivity and pH values measured are reported in the table below.

Under stirring at 5 000 rpm, the additive type (in the form of an aqueous solution) indicated in each of the tests described in the table below (PA=additive according to the prior art, IN=additive according to the present invention), is added in the indicated amount to the slurry over a period of one minute. After completed addition, the slurry is stirred for an additional 5 minutes, after which time the suspension pH and the conductivity are measured at room temperature.

TABLE 2

| Test | | Suspension volume solid content (vol. %) | Initial suspension conductivity (+/−10 μS/cm) -- pH (+/−0.1) | Additive Type (in solution)/ Solution concentration | Additive addition amount (mg/l of aqueous phase) | Conductivity (+/−10 μS/cm) -- pH (+/−0.1) after additive addition | μS/cm/ pH unit | Viscosity after 0 day [mPas] | Viscosity after 2 days [mPas] | Viscosity after 4 days [mPas] | Viscosity after 7 days [mPas] |
|---|---|---|---|---|---|---|---|---|---|---|---|
| 3 | PA | 56.9 | 1 024 -- 8.8 | KOH/30% | 3 565 | 1 767 -- 12.9 | 181 | 688 | 1018 | 1236 | 1336 |
| 4 | IN | 56.9 | 1 024 -- 8.8 | 2-((1-methyl-propyl)amino)ethanol/100% | 3 565 | 1 025 -- 10.7 | 1 | 324 | 324 | 324 | 336 |

| Test | | Suspension volume solid content (vol %) | Initial suspension conductivity (+/−10 µS/cm)-- pH(+/−0.1) | Additive Type (in solution)/ Solution concentration | Additive addition amount (mg/l of aqueous phase) | Conductivity (+/−10 µS/cm)/ pH (+/−0.1) after additive addition | µS/cm/ pH unit |
|---|---|---|---|---|---|---|---|
| 1 | PA | 56.9 | 1283/8.4 | KOH/30% | 543 | 1408/9.4 | 125 |
| 2 | IN | 56.9 | 1283/8.4 | 2-((1-methyl-propyl)ami-no)ethanol/100% | 2230 | 1292/9.4 | 9 |

As can be gathered from the results in the table, the increase in suspension conductivity was more than 100 µS/cm per pH unit for KOH, whereas in the case of 2-((1-methylpropyl)amino)ethanol the conductivity increase was only 9 µS/cm per pH unit. Thus, these data show a clear difference between the use of KOH and 2((1-methylpropyl)amino)ethanol.

The invention claimed is:

1. A method for increasing the pH of an aqueous suspension, containing from 25 to 62 vol. % based on the total volume of the suspension of at least one calcium carbonate-comprising material and having a pH in the range of between 8.5 and 11, comprising adding 2-((1-methylpropyl)amino) ethanol to the suspension in an amount so that the pH of the suspension is increased by at least 0.3 pH units and the conductivity change is not more than 100 µS/cm per pH unit.

2. The method according to claim 1, wherein the 2-((1-methylpropyl)amino) ethanol additive is added as a water based solution to the calcium carbonate-comprising material.

3. The method according to claim 1, wherein the 2-((1-methylpropyl)amino) ethanol additive has a chemical purity of more than 90% in respect to 2-((1-methylpropyl)amino) ethanol.

4. The method according to claim 1, wherein the 2-((1-methylpropyl)amino) ethanol additive has a chemical purity of more than 95% in respect to 2-((1-methylpropyl)amino) ethanol.

5. The method according to claim 1, wherein the suspension has a conductivity of between 700 and 2000 µS/cm prior to the 2-((1-methylpropyl)amino)ethanol addition.

6. The method according to claim 1, wherein the suspension has a conductivity of between 800 and 1300 µS/cm prior to the 2-((1-methylpropyl)amino)ethanol addition.

7. The method according to claim 1, wherein following the addition of 2-((1-methylpropyl)amino)ethanol, the suspension conductivity change is not more than 70 µS/cm per pH unit.

8. The method according to claim 1, wherein following the addition of 2-((1-methylpropyl)amino)ethanol, the suspension conductivity change is not more than 50 µS/cm per pH unit.

9. The method according to claim 1, wherein following the addition of 2-((1-methylpropyl)amino)ethanol, the suspension conductivity does not change by more than 10%.

10. The method according to claim 1, wherein following the addition of 2-((1-methylpropyl)amino)ethanol, the suspension conductivity does not change by more than 10%.

11. The method according to claim 1, wherein prior to addition of 2-((1-methylpropyl)amino)ethanol, the suspension has a pH between 9 and 10.3.

12. The method according to claim 1, wherein 2-((1-methylpropyl)amino)ethanol is added to the suspension in an amount to increase the pH of the suspension by at least 0.4 pH units.

13. The method according to claim 1, wherein when the suspension pH prior to 2-41-methylpropyl)amino ethanol addition is between 8.5 and 9, 2-((1-methylpropyl)amino) ethanol is added to the suspension in an amount to increase the pH of the suspension by at least 1.0 pH unit, and when the suspension pH prior to 2-((1-methylpropyl)amino)ethanol addition is between 9 and 10, 2-((1-methylpropyl)amino) ethanol is added to the suspension in an amount to increase the pH of the suspension by at least 0.7 pH units.

14. The method according to claim 1, wherein prior to 2-((1-methylpropyl)amino) ethanol addition, the suspension has a temperature of between 5 and 100° C.

15. The method according to claim 1, wherein 2-((1-methylpropyl)amino)ethanol is added to the suspension in an amount of from 500 to 15000 mg per liter of the aqueous phase of the suspension.

16. The method according to claim 1, wherein 2-((1-methylpropyl)amino)ethanol is added to the suspension in an amount of from 1000 to 5000 mg per liter of the aqueous phase of the suspension.

17. The method according to claim 1, wherein 2-((1-methylpropyl)amino)ethanol is added to the suspension in an amount of from 1300 to 2000 mg per liter of the aqueous phase of the suspension.

18. The method according to claim 1, wherein the calcium carbonate-comprising material comprises at least 50% by weight of calcium carbonate relative to the total weight of the calcium carbonate-comprising material.

19. The method according to claim 1, wherein the calcium carbonate-comprising material comprises at least 80% by weight of calcium carbonate relative to the total weight of the calcium carbonate-comprising material.

20. The method according to claim 1, wherein the calcium carbonate of the carbonate-comprising material is a precipitated calcium carbonate (PCC), a natural ground calcium carbonate (NGCC), a surface-reacted calcium carbonate (SRCC), or any mixture thereof.

21. The method according to claim 1, wherein the suspension comprises from 45 to 60 vol. % of the calcium carbonate-comprising material based on the total volume of the suspension.

22. The method according to claim 1, wherein the suspension comprises from 48 to 58 vol. % of the calcium carbonate-comprising material based on the total volume of the suspension.

23. The method according to claim 1, wherein the 2-((1-methylpropyl)amino) ethanol is added prior to, during or after, a step of grinding said calcium carbonate-comprising material in the suspension.

24. The method according to claim 1, wherein 2-((1-methylpropyl)amino)ethanol is added to the dry form of the calcium carbonate-comprising material, and is optionally dry ground therewith before forming the suspension of the calcium carbonate-comprising material.

25. The method according to claim 1, wherein following addition of 2-((1-methylpropyl)amino)ethanol to the suspension, the suspension is introduced in a unit equipped with a conductivity-based regulation device.

26. The method according to claim 25, wherein following addition of 2-((1-methylpropyl)amino)ethanol to the suspension, the suspension is introduced in a container or unit up to a level determined by measurement of the suspension conductivity.

27. The method according to claim 25, wherein following addition of 2-((1-methylpropyl)amino)ethanol to the suspension, the suspension is passed through a passage having a suspension throughput regulated as a function of the suspension conductivity.

* * * * *